Patented June 2, 1936

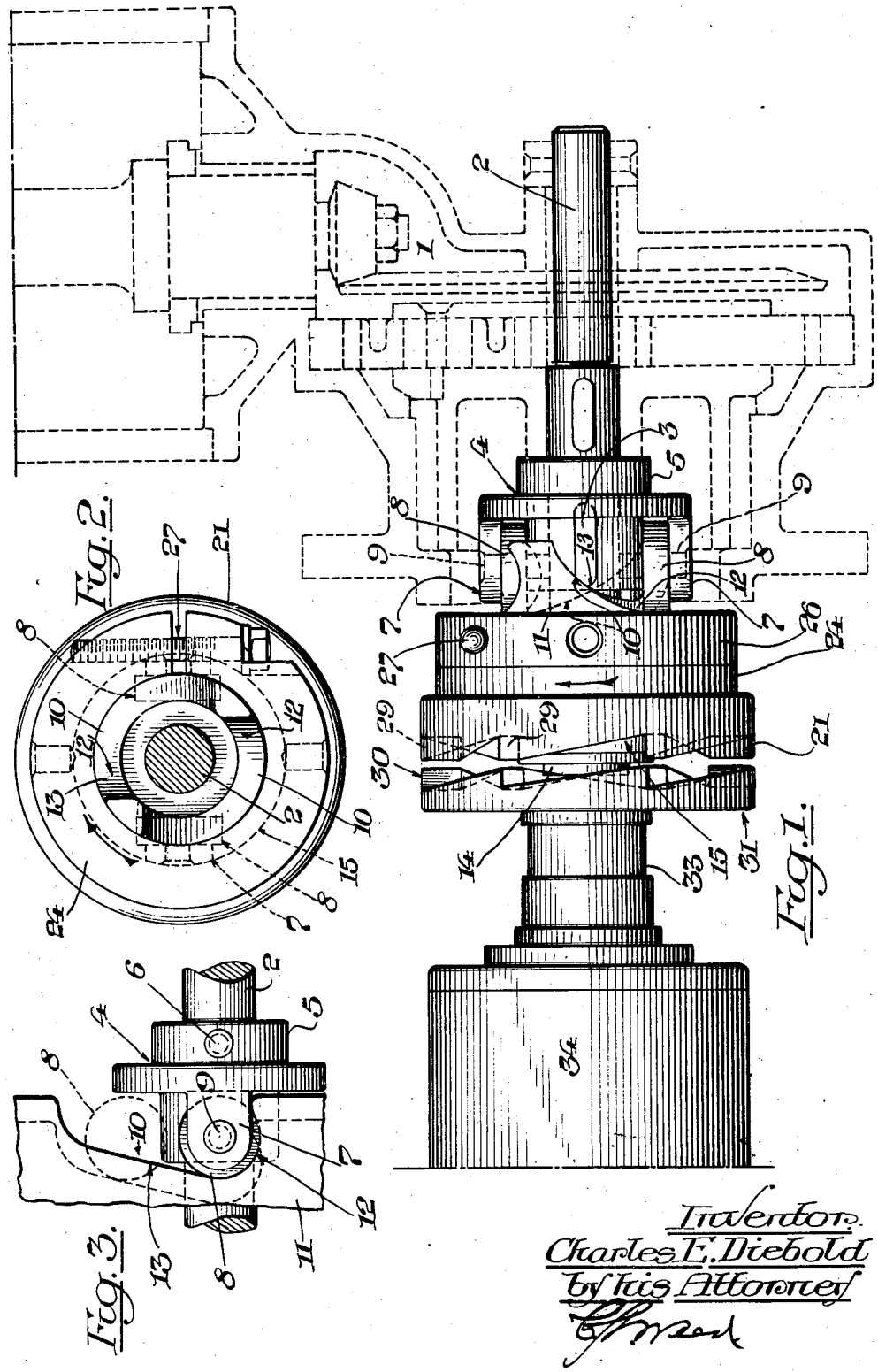

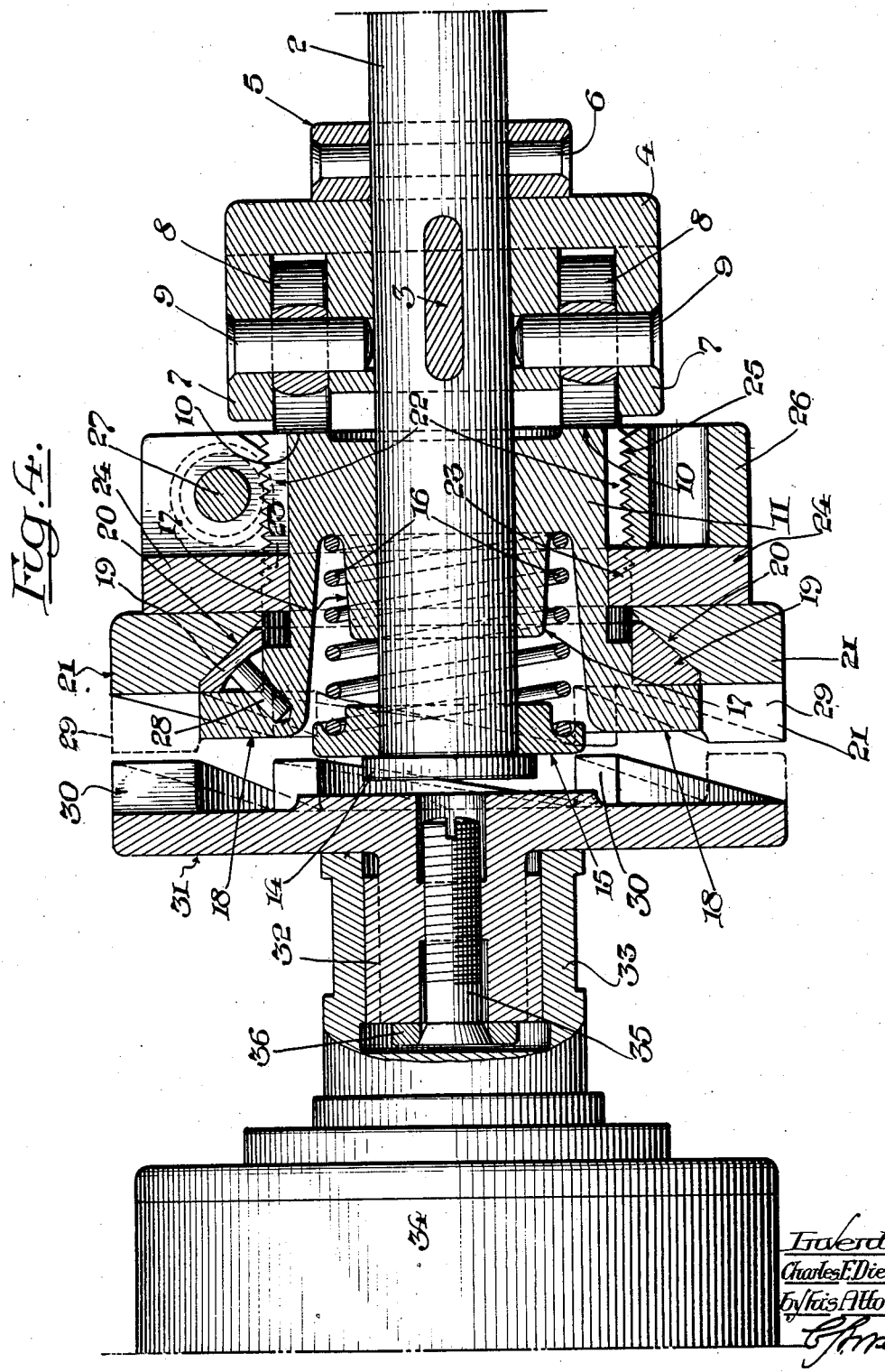

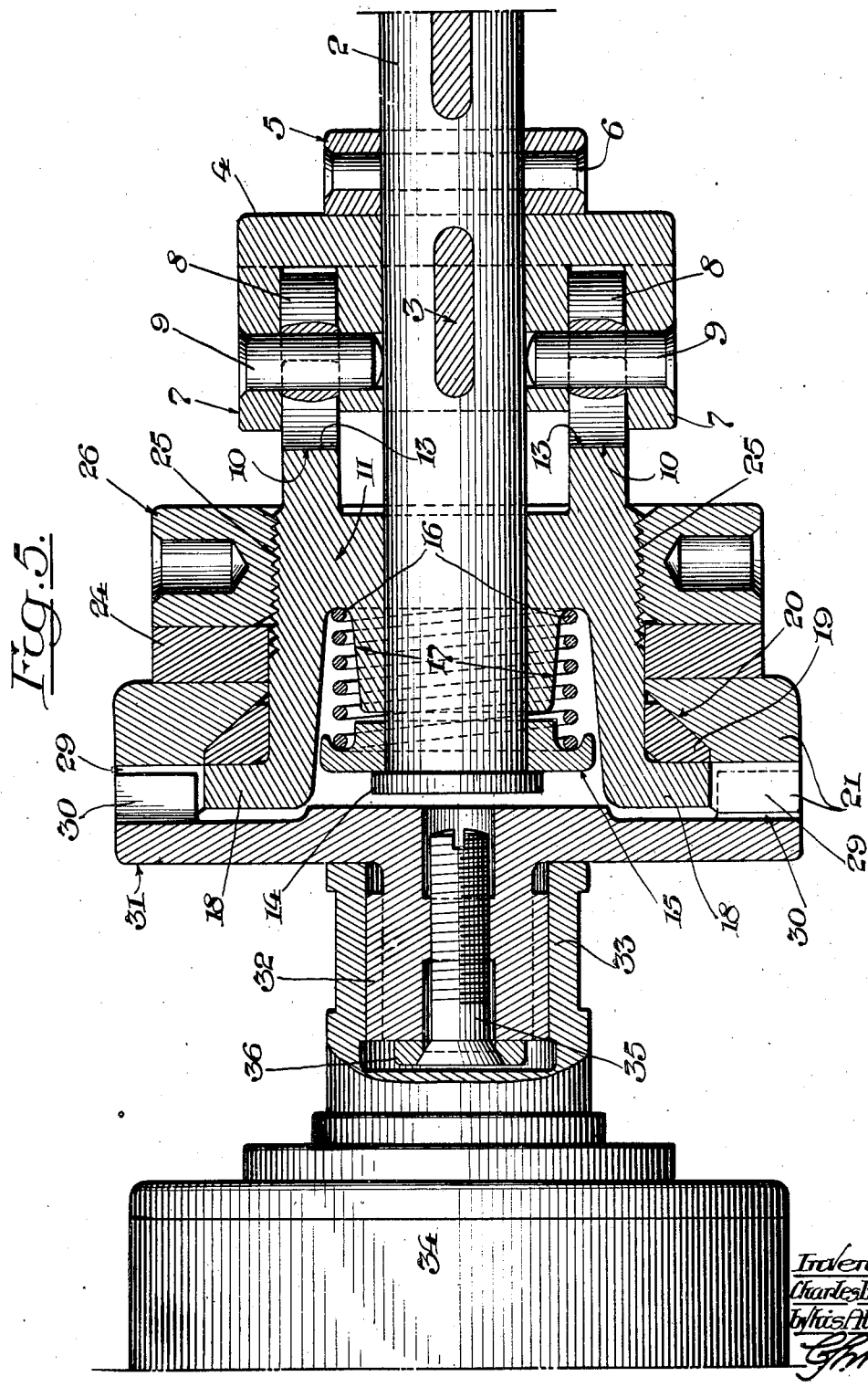

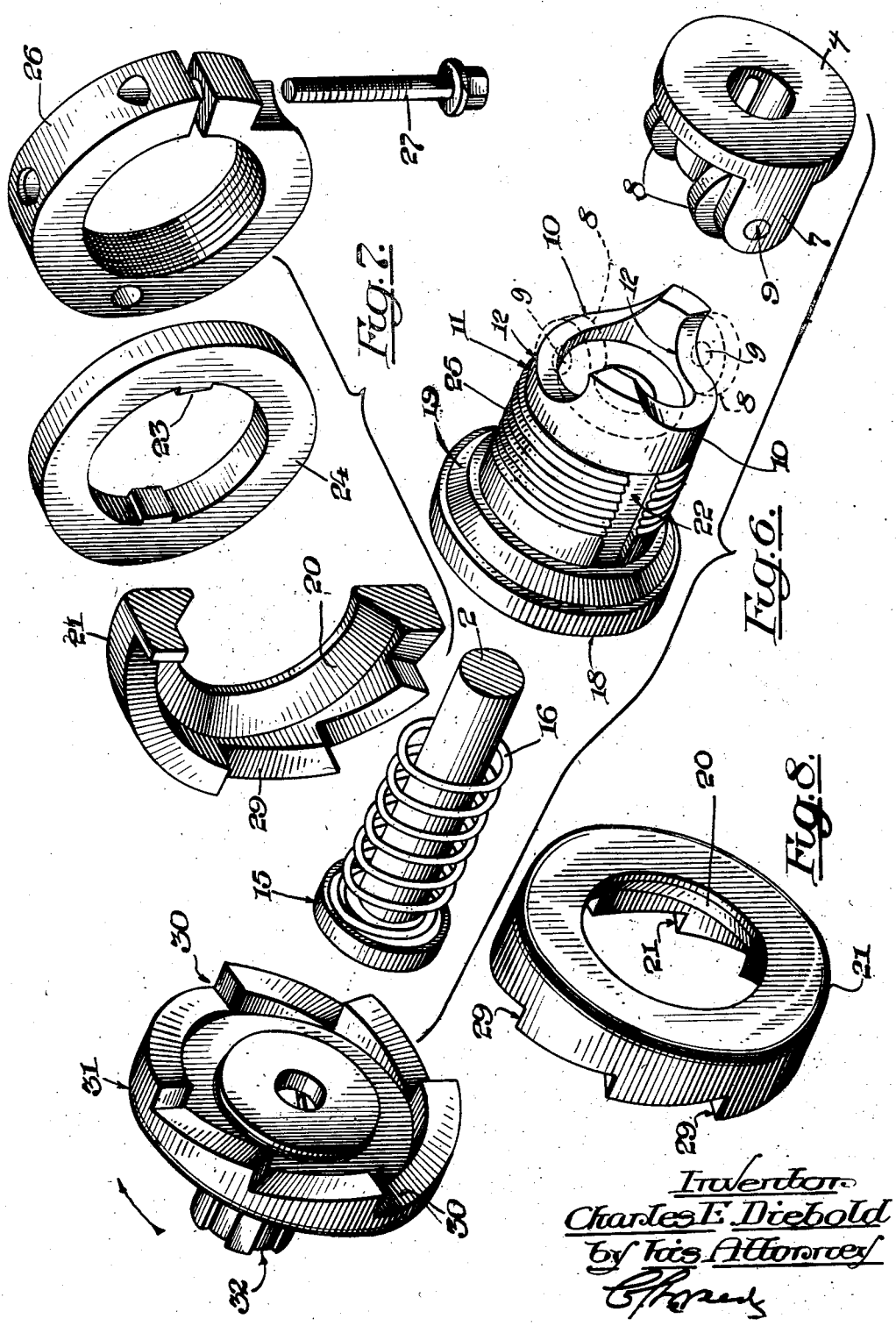

2,042,514

UNITED STATES PATENT OFFICE 2,042,514

POWER TRANSMISSION MECHANISM

Charles E. Diebold, Cleveland, Ohio, assignor to The National Acme Company, Cleveland, Ohio, a corporation of Ohio Application February 21, 1933, Serial No. 657,813

11 Claims. (Cl. 74—9)

This invention relates to power transmission devices such as engine starters, the object of the invention being to provide an improved starting mechanism that absorbs the impact derived from rotation reversal, the improvement being particularly adapted for aeronautical or marine starting units or other types of automotive units, where a mass reversal must be distributed consistent with the dissipation of the impact.

Another object of the invention is the provision of an improved engine starter unit which can be readily adapted to airplane starting motors where a positive self-contained and light starting unit is required.

A further object of the invention is the provision of a combined frictionally operated and driven tooth formed clutch mechanism for transmitting power simple in construction and efficient in use and which is particularly adapted for use as a motor starter.

Heretofore starter units have comprised various mechanical methods of transmitting driving power as a starting means, such as springs, which are always more or less unreliable and usually engine starters have contacted with the motor either by means of gears or by friction clutches, but this improved engine starter is adapted to engage the motor by means of a toothed clutch so constructed that the reversal of the motor due to backfire will not injure the mechanism.

In the drawings accompanying and forming a part of this specification—

Fig. 1 is a plan view illustrating this improved engine starter disengaged from the engine, the dotted lines showing the gear mechanism and motor used to start the starter;

Fig. 2 is an end view partly in section of the friction disc;

Fig. 3 is a view showing the camming surface development;

Fig. 4 is a longitudinal sectional view of the starter shown in Fig. 1, disengaged;

Fig. 5 is a similar view of the starter engaged with the motor; and

Figs. 6, 7 and 8 are detail perspective views of parts of the starter unassembled.

Similar characters of reference indicate corresponding parts in the several views.

Before explaining in detail the present improvement and mode of operation thereof, I desire to have it understood that the invention is not limited to the details of construction and arrangement of parts which are illustrated in the accompanying drawings, since the invention is capable of other embodiments and that the phraseology which I employ is for the purpose of description and not of limitation.

As a matter of explanation, various products require varied driven speeds and the driver unit can be made variable with the insertion of a gear train or other reduction means. In the instant case, however, the starter is driven through a gear reduction by a motor of predetermined energy shown in dotted lines and generally indicated by 1, hereinafter called the driving unit. The gear reduction is inserted to increase or decrease the R. P. M. of the driven unit.

This driver unit imparts rotary motion to the shaft 2 which has secured thereon by a key 3 a roll carrier 4. This roll carrier 4 is suitably held in place by a ring 5 secured to the shaft by a pin 6.

The roll carrier 4 has a pair of projecting ears 7 carrying a pair of rollers 8 axially supported within the ears by pins 9 in such manner as to permit the rollers to extend beyond the extremity of the ears.

These rollers engage and travel along a pair of oppositely disposed cams 10 of suitable predetermined angle carried by a housing or sleeve 11 and thus permit the rollers to force this housing or sleeve 11 hereinafter described forward when they travel along the angular surface 13 of the cams.

Fig. 3 illustrates a development of one of the cams 10 showing one of the rollers 8 at rest in a seat 12 of the cam, the dotted lines illustrating the camming action when the roller travels along the inclined surface 13 of the cam.

The housing or sleeve 11 is bored so as to freely rotate upon the starter shaft 2 which has a flanged end 14. On the starter shaft and behind the flange 14 is a spring retaining collar 15, and therebetween and the housing 11 is a coil spring 16 fitting a tapered portion 17 of the housing. The sleeve 11 has a hub portion which is mounted on the shaft 2 and surrounding a part of this hub portion, the sleeve has a radially spaced portion having an outwardly extending collar 18 behind which is located a tapered friction ring 19 adapted to snugly fit the oppositely tapered portion 20 of a driving toothed clutch member 21 mounted on the housing. This friction ring 19 is held against rotation by a pin 28. The sleeve 11 has a pair of oppositely disposed recesses 22 for the reception of inwardly projecting lugs 23 of the friction ring 24 and also an externally threaded portion 25 for the reception of a split lock collar or ring 26 clamped together by a bolt 27.

This locking collar 26 is screwed in place until the desired tension is obtained upon the driving toothed clutch member 21 through the friction ring 24 and is then locked in place and prevented from turning on the sleeve 13 by the clamping bolt or screw 27.

The driving clutch member 21 has clutch teeth 29 adapted to engage similarly formed teeth 30 of the driven clutch member 31.

This driven clutch member 31 has a ribbed hub 32 to engage in a similarly formed hub 33 of the fly-wheel 34 to impart rotation thereto and these ribbed hubs are held in locked engagement by a screw 35 and washer 36.

In operation when the driver unit is started the shaft 2 is rotated whereupon the roll carrier 4 causes the rollers 8 to travel the inclined camming faces 13 of the cams 10 and thus force the sleeve 11 forward on its shaft 2 thereby compressing the spring 16 and effecting the engagement of the clutch. While the sleeve 11 is free upon the shaft it nevertheless is held against rotation due to friction during this camming action until the camming action is complete and the clutch members are properly meshed. When the rollers have traveled the length of the inclined faces of the cams 10, further travel is prevented by the curved ends of the cam faces which form stops 13'. At this time also, further forward sliding movement of the sleeve 11 on the shaft 2 ceases and, by reason of the contact between the cam rollers and the stop faces 13', the sleeve 11 is then rotated, thus driving the clutch member 21 which is clamped between the friction rings 19 and 24 by the adjustable nut 26, the ring 24 being, as before stated, keyed to the sleeve 11 and rotating therewith. Thus, the driven clutch member 31 is rotated until the motor fires. As the driven clutch member will then rotate faster and thus overrun the driving clutch member, the latter, by means of the spring 16 will be returned to its normal position and the cam rollers will rest in their seats 12. In the event of backfire or compression reverse, as the clutch members are still engaged, the driving clutch member 21 simply slips or rotates backward relative to the shaft 2 by reason of its frictional engagement only with the rings 19 and 24 without reversing the shaft 2 or causing breakage of the parts, the amount of slippage being controlled by the load exerted by the locking nut 26. When reversal energy is expended, the driver clutch member assembly recedes to its normal position.

In practice, when the rollers have traveled the full length of the inclined cam faces and have reached the stops 13', further forward movement of the driving toothed clutch is impossible and at this time there is a slight clearance between the height and root diameter of the teeth, in other words, a slight play or clearance, so that if the inclined faces of the cams were made longer, the teeth would be more fully engaged. Consequently, when the motor back-fires, as the driven clutch member cannot move any further forward and the pressure exerted by the engine being greater than the pressure exerted by the cam rolls, it follows that the driving clutch member will slip with relation to the friction ring 24.

The friction ring 24 being located between the clutch member 21 and the driving disk 20, as hereinbefore stated, when back-fire occurs, the clutch disk 21 will slip with relation to the disk 24 and driving unit 11, as the friction disk permits this slipping. This friction disk acts not only as a safety in case of back-fire but also as a cushion for the starter. The driving clutch 21 is provided on one side with a straight face against the friction ring 24 and with a tapered portion 20 on the inside which fits against the tapered friction ring 19 on the driving sleeve 11 which centers the clutch 21 by means of the taper and increases the friction surface between the members 19 and 24. This can be adjusted by the adjusting ring or nut 26.

A variable load can be exerted on driver clutch member consistent with a larger or smaller design depending on the space in which the design can be placed.

While this device is particularly adapted as a starter unit for aeronautical and marine engines, it is likewise adapted for use with automotive or combustion engines of any kind.

It is to be understood that, by describing in detail herein any particular form, structure or arrangement, it is not intended to limit the invention beyond the terms of the several claims or the requirements of the prior art.

Having thus explained the nature of my said invention and described a way of constructing and using the same, although without attempting to set forth all of the forms in which it may be made, or all of the modes of its use, I claim:

1. A power transmission mechanism comprising a shaft, a housing freely mounted on said shaft for sliding movement and for rotation in one direction relative to said shaft and having a cam surface, a roll carrier fixed to said shaft against movement independently thereof and provided with a roll for engaging said cam surface, a driving toothed clutch member carried by said housing for movement therewith, adjustable means adjacent to the rear face of the driving clutch member for frictionally driving said member, a spring for shifting said housing in one direction, and a tooth-formed driven clutch member in position to co-operate with said driving clutch member.

2. A power transmission mechanism comprising a shaft, a housing freely mounted on said shaft for sliding movement and for rotation in one direction relative to said shaft and having a cam surface, a roll carrier fixed to said shaft against movement independently thereof and provided with a roll for engaging said cam surface, a toothed clutch member carried by said housing for movement therewith, a spring for shifting said housing in one direction, a toothformed driven clutch member in position to cooperate with said driving clutch member, and independent means for clamping the clutch member on said housing.

3. A power transmission mechanism comprising a driven member, a tooth formed driven clutch member for driving said driven member, a rotary shaft, a housing freely mounted on said shaft for axial movement and for rotation in one direction relative thereto, a driving clutch member mounted on said housing, means on the housing for adjustably clamping said driving clutch member in position, a spring encircling said shaft for shifting the housing and its clutch member in one direction, said housing having a pair of axially extending cam faces, a roll carrier and its rolls fixed to said shaft against movement independently thereof for rotation therewith and cooperating with said cam faces on the rotation of the shaft to force the housing and the driving clutch member into engagement with the driven clutch member, the overrunning of the clutch members causing the spring to disengage the same and the reversal of the driven clutch member being effective to cause the driving clutch member to rotate freely relative to said shaft.

4. A power transmission mechanism comprising driving and driven clutch tooth members, a driving shaft relative to which the driving member is freely mounted, cam operated means operative on the rotation of the shaft to effect the engagement of the clutch members, and including adjustable frictional means adjacent to the rear face of said driving member for permitting slippage of the clutch member on the reversal of the driven clutch member, and means for disengaging the clutch members when the driven clutch member overruns the driving clutch member, the reversal of the driven clutch member being effective to cause the driving clutch member to rotate freely relative to said shaft.

5. A power transmission mechanism comprising a driven member, a driving shaft, a pair of co-operating driving and driven toothed clutch members for effecting connection between the shaft and driven member, the driving clutch member being shiftable relative to the shaft, a roll carrier fixed to said shaft and having a roll, a cam face co-operating with the roll for shifting the driving clutch member whereby on the rotation of the shaft the driving clutch member will be forced into engagement with the driven clutch member, and adjustable means adjacent to the rear face of the driving clutch member for frictionally driving said member.

6. A power transmission mechanism comprising a shaft, a sliding and rotatable sleeve thereon, a driving member adapted to engage a driven member of a motor, means for frictionally clamping said driving member on said sleeve for movement therewith, said sleeve having a cam surface, a pair of friction members or rings secured to the sleeve for rotation therewith and one adjustable relative to the sleeve for frictionally clamping the driving member between said members and on said sleeve, and a cam rotatable with said shaft to slide and rotate the sleeve and thereby the driving member.

7. A power transmission mechanism comprising a shaft, a sliding and rotatable sleeve thereon, a driving member adapted to engage a driven member of a motor and having a tapered surface and frictionally clamped on said sleeve for movement therewith, said sleeve having a cam surface, a pair of friction members or rings secured to the sleeve for rotation therewith, one having a tapered surface co-operating with the tapered surface of the driving member and the other adjustable relative to the sleeve for frictionally clamping the driving member on said sleeve, and a cam rotatable with said shaft to slide and rotate the sleeve and thereby the driving member.

8. A power transmission mechanism comprising a driving shaft, a plurality of oppositely disposed cam rolls rotatable with said shaft, a single sleeve longitudinally shiftable and rotatable on said shaft and having oppositely disposed cam faces co-operating with said rolls for shifting the sleeve on the shaft and for rotating the sleeve when the rolls reach a predetermined point on said cam faces, said sleeve comprising a hub mounted on the shaft and an annular portion overlapping a projecting part of said hub and radially spaced from its hub and shaft, means located in the space between said hub and the annular portion for returning the sleeve to its normal position, a driving member on said radially spaced portion of the sleeve and shiftable and rotatable with said sleeve and adapted to engage a driven member of a motor and also having a movement independent of the sleeve, and means effective to secure said driving member on the sleeve and insure said movements of the driving member.

9. A power transmission mechanism comprising a driving shaft, a plurality of oppositely disposed cam rolls fixed to the shaft against movement independently thereof and rotatable with said shaft, a single sleeve longitudinally shiftable and rotatable on said shaft and having oppositely disposed cam faces co-operating with said rolls for shifting the sleeve on the shaft and for rotating the sleeve when the rolls reach a predetermined point on said cam faces, said sleeve comprising a hub mounted on the shaft and an annular portion overlapping a projecting part of said hub and radially spaced from its hub and shaft, means located in the space between said hub and the annular portion for returning the sleeve to its normal position, a driving member on said radially spaced portion of the sleeve and shiftable and rotatable with said sleeve and adapted to engage a driving part of a motor, and means for frictionally clamping said driving member on the radially spaced portion of said sleeve.

10. A power transmission mechanism comprising a rotatable shaft, a sleeve rotatable and sliding on said shaft and having cam surfaces projecting from the rear end thereof, co-operating cam engaging means fixed to the shaft for rotation therewith and having no movement independently thereof for shifting and rotating the sleeve relative to the shaft, said sleeve having means for limiting the position of the cam engaging means relative to said cam surfaces, a driving member on said sleeve for engaging a driven member of a motor, a pair of ring members secured to the sleeve for rotation therewith for frictionally securing the driving member therebetween and thereby frictionally securing it to the sleeve, one ring member interlocked with and shiftable on the sleeve, adjustable means on the sleeve for exerting tension on the shiftable ring member and thereby on the driving member whereby said driving member is rotatable with the sleeve and also independently thereof, and resilient means surrounding the shaft and within the sleeve for forcing it into engagement with the cam engaging means and also effective to release the driving and driven members.

11. A power transmission mechanism comprising a rotatable shaft, a sleeve rotatable and slidable on said shaft and having a cam surface terminating in a stop face, a co-operating cam engaging means fixed to the shaft for rotation therewith and having no movement independently thereof for shifting and rotating the sleeve relative to the shaft, a driving member on said sleeve for engaging a driven member of a motor, means for adjustably and frictionally clamping said driving member on said sleeve for movement therewith and whereby various tensions may be exerted on said driving member whereby said driving member is rotatable with the sleeve and also independently thereof, and resilient means for forcing the sleeve into engagement with the fixed cam engaging means and also effective to release the driving and driven members.

CHARLES E. DIEBOLD.